US005815903A

United States Patent [19]

Foster et al.

[11] Patent Number: 5,815,903

[45] Date of Patent: Oct. 6, 1998

[54] PACKAGING SYSTEM

[75] Inventors: James Foster, Lakewood; Jack Smylie, Purdue, both of Mich.

[73] Assignee: Packing Material Company, Farmington Hills, Mich.

[21] Appl. No.: 967,198

[22] Filed: Oct. 29, 1997

Related U.S. Application Data

[63] Continuation of Ser. No. 551,628, Nov. 1, 1995, abandoned.

[51] Int. Cl.[6] .......... B23P 11/00; B65D 85/00; A47B 63/00

[52] U.S. Cl. .......... 29/401.1; 206/425; 211/46

[58] Field of Search .......... 29/401.1; 206/425, 206/564; 220/530, 534, 535, 544; 211/46, 162

[56] References Cited

U.S. PATENT DOCUMENTS

| | | | |
|---|---|---|---|
| 492,163 | 2/1893 | Ives . | |
| 1,217,243 | 2/1917 | Potts . | |
| 2,325,317 | 7/1943 | Hanna . | |
| 2,329,201 | 9/1943 | Jonas . | |
| 3,249,111 | 5/1966 | Vincens | 211/46 |
| 3,570,678 | 3/1971 | Lundberg | 211/46 |
| 3,684,340 | 8/1972 | Kirkorian . | |
| 3,885,726 | 5/1975 | Frilund et al. . | |
| 3,977,450 | 8/1976 | Schampier . | |
| 4,262,808 | 4/1981 | Laporte | 211/46 |
| 4,284,227 | 8/1981 | Corey . | |
| 4,420,086 | 12/1983 | Bardes | 211/46 |
| 4,475,657 | 10/1984 | Albery . | |
| 4,529,092 | 7/1985 | Swingley, Jr. . | |
| 4,542,777 | 9/1985 | Benson . | |
| 4,590,610 | 5/1986 | Rhyne . | |
| 4,730,736 | 3/1988 | Lindquist . | |
| 4,830,268 | 5/1989 | Pitts . | |
| 4,848,928 | 7/1989 | Ausnit . | |
| 4,856,660 | 8/1989 | Selwyn-Smith | 211/46 |
| 4,988,006 | 1/1991 | Lundin | 211/46 |
| 5,025,979 | 6/1991 | Dellacroce . | |
| 5,163,606 | 11/1992 | Isserstedt . | |
| 5,190,152 | 3/1993 | Smith et al. . | |
| 5,193,701 | 3/1993 | Bush et al. | 206/425 |
| 5,226,734 | 7/1993 | Scott et al. . | |
| 5,358,125 | 10/1994 | Blessing | 211/46 |

FOREIGN PATENT DOCUMENTS

| | | | |
|---|---|---|---|
| 2905704 | 8/1980 | Germany . | |
| 0274598 | 11/1990 | Japan | 206/425 |
| 2218673 | 11/1989 | United Kingdom | 206/425 |

*Primary Examiner*—S. Thomas Hughes
*Assistant Examiner*—Tisa Stewart
*Attorney, Agent, or Firm*—Harness, Dickey & Pierce, PLC

[57] ABSTRACT

A packaging system is provided wherein a support structure such as a container, bin or rack having a free edge is converted into an apparatus for at least temporarily storing one or more objects in a suspended manner. The system generally includes at least one hanger bar profile, at least one hanger bar or both from one or more compliant receptacles are suspended. The one or more compliant receptacles can be made from a variety of different materials but are generally capable of conforming to the overall geometry of objects contained therein. Further, the receptacles are generally accessible for the insertion and removal of objects through an opening provided along the top edge. Methods of converting support structures into apparatuses for at least temporarily storing one or more objects in a suspended state are also provided.

35 Claims, 10 Drawing Sheets

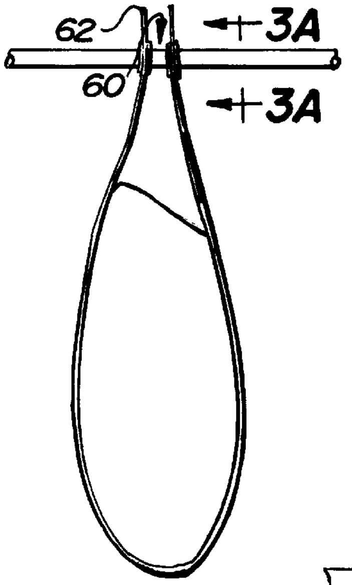
Fig-3
Fig-4
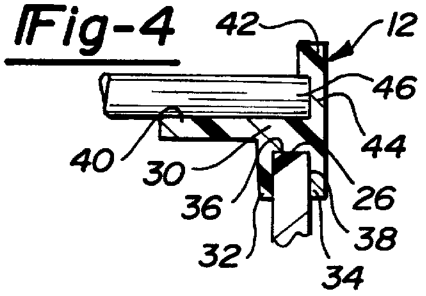
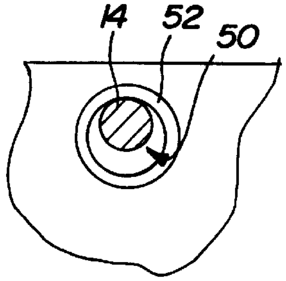
Fig-3A
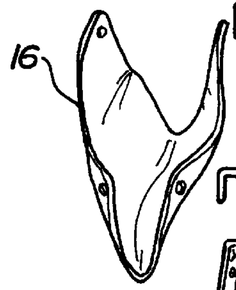
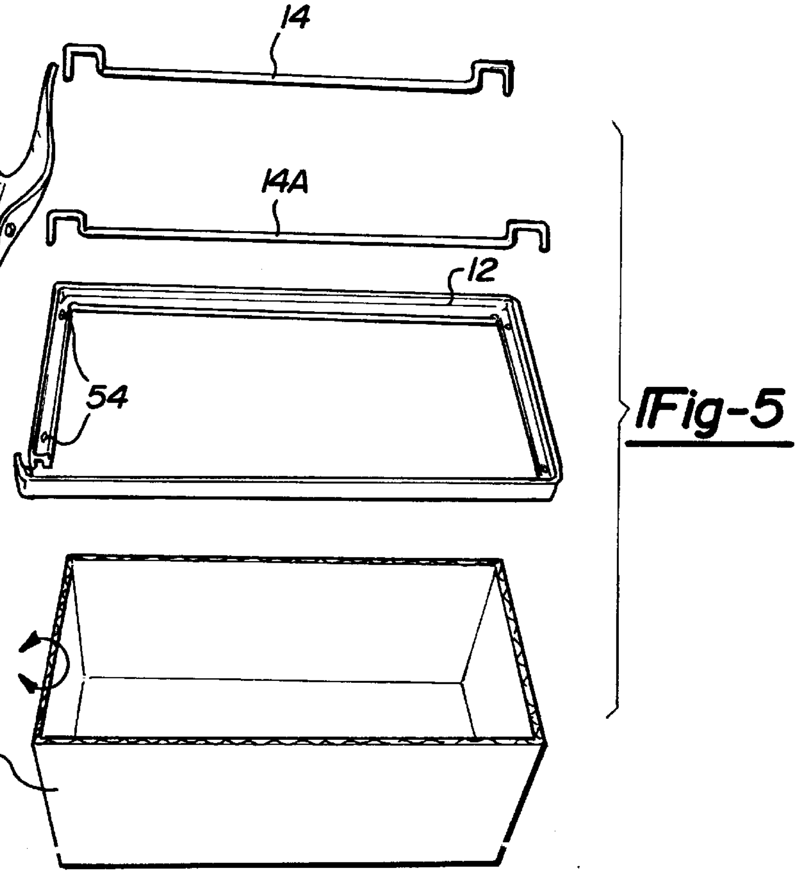
Fig-5
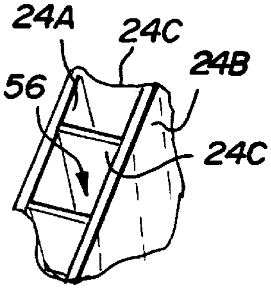
Fig-5A

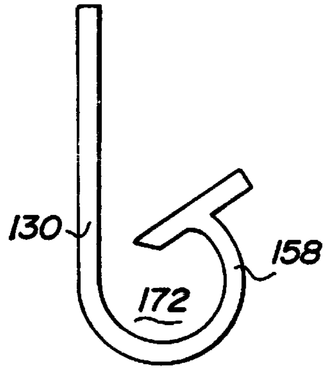
Fig-8A
Fig-8B
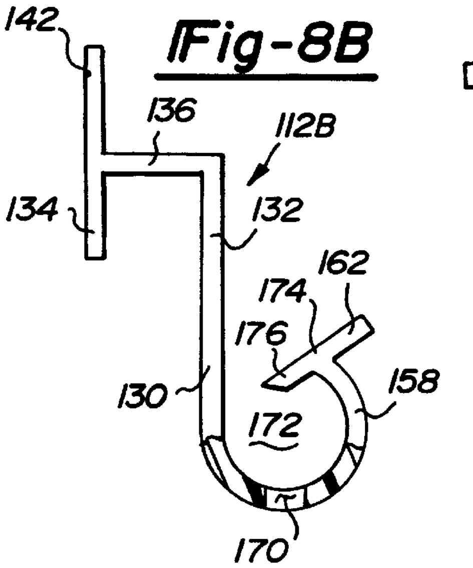
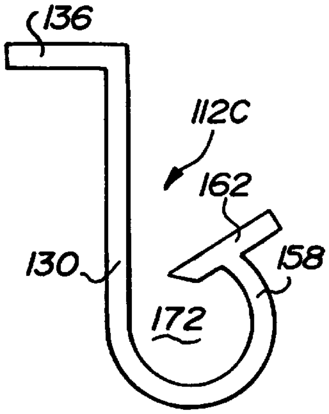
Fig-8C
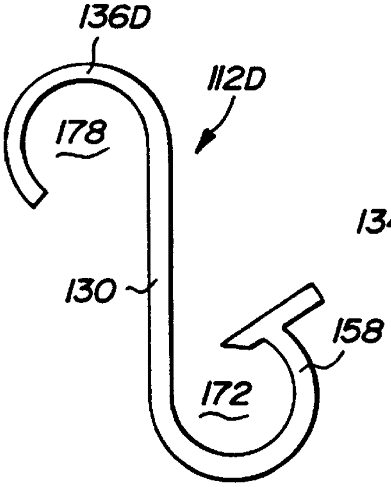
Fig-8D
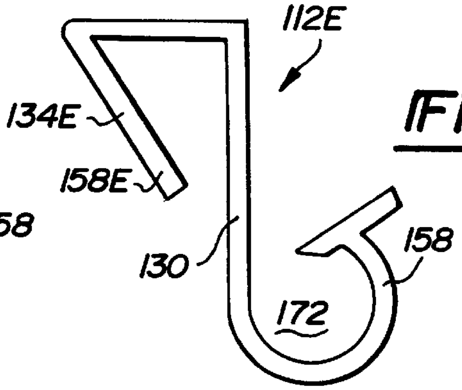
Fig-8E
Fig-8F
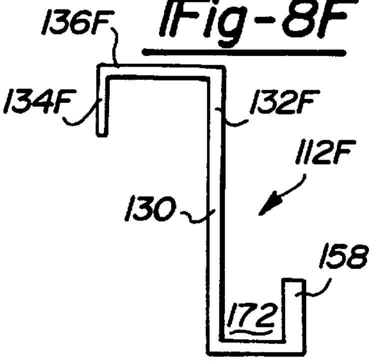
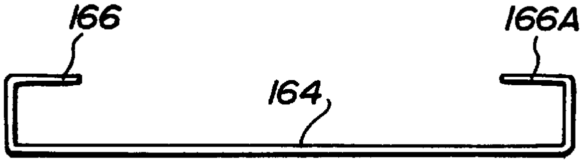
Fig-9A
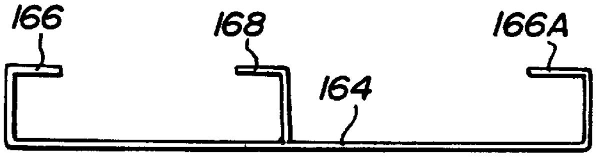
Fig-9B

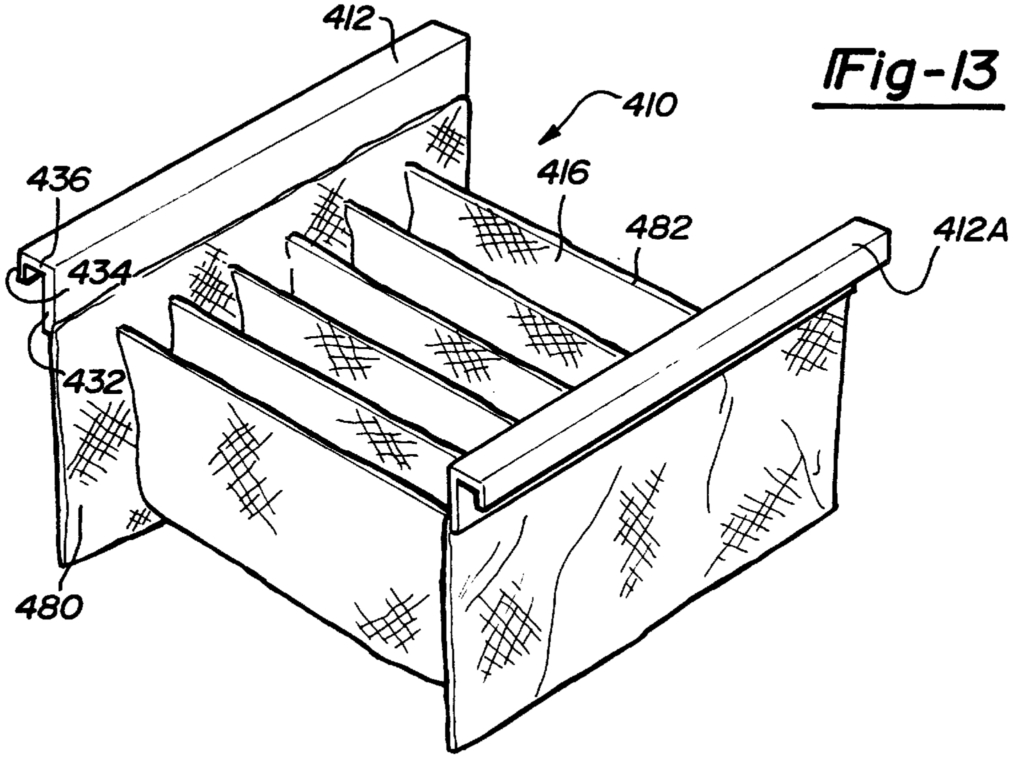
Fig-13
Fig-14
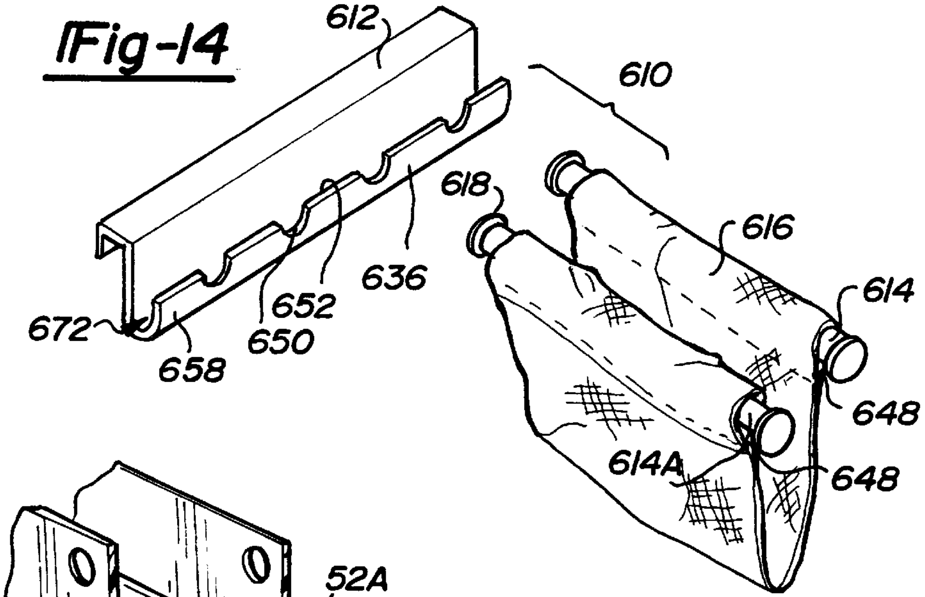
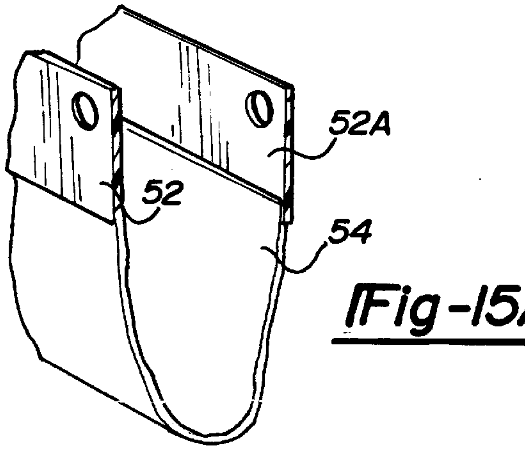
Fig-15A

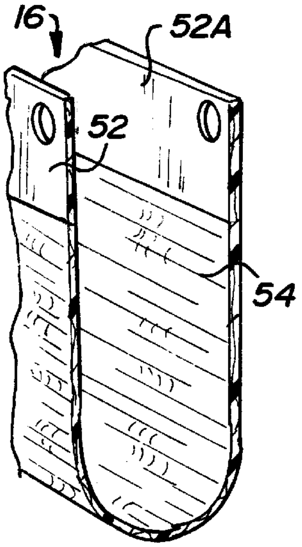
IFig-15B
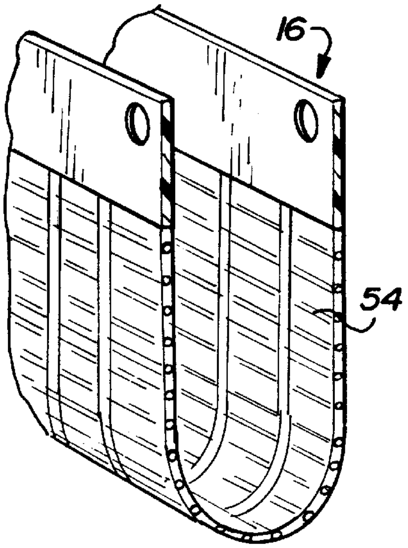
IFig-15C
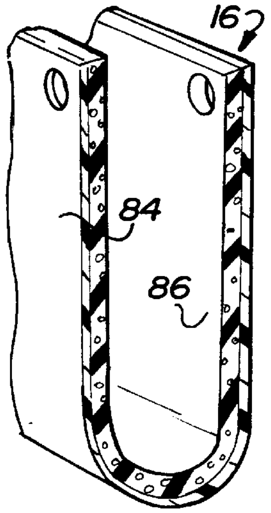
IFig-15D
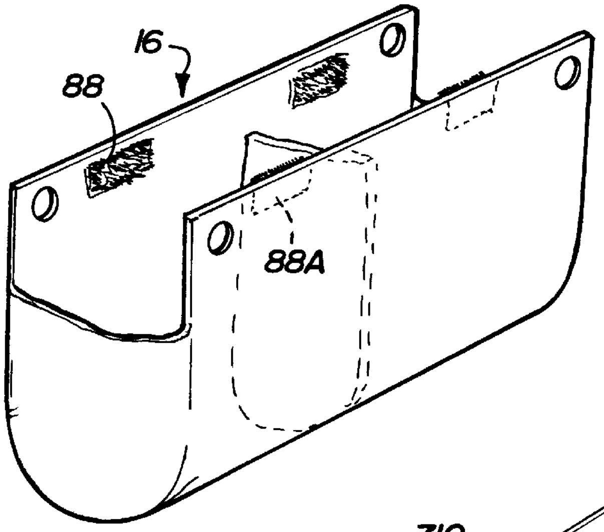
IFig-16
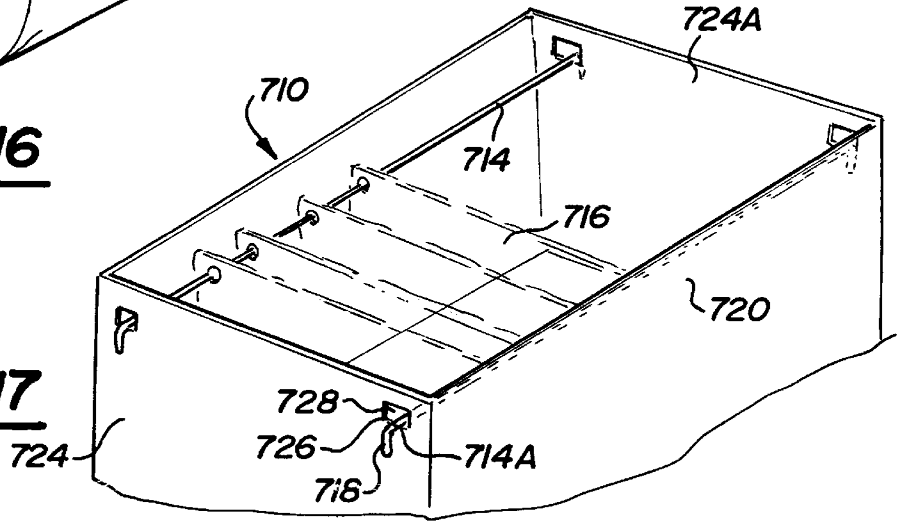
IFig-17

Fig-18
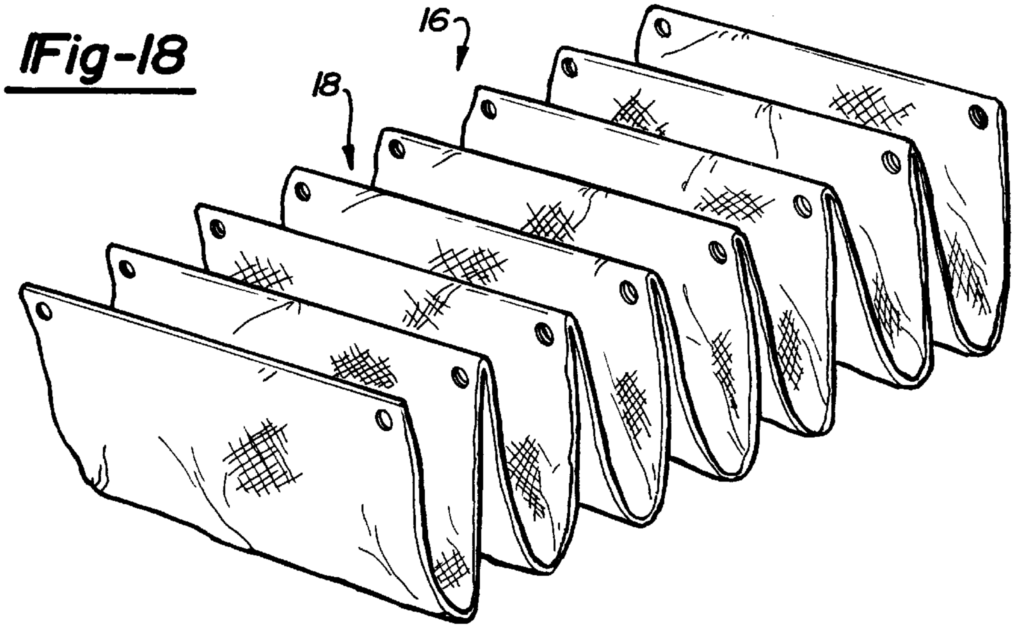
Fig-19
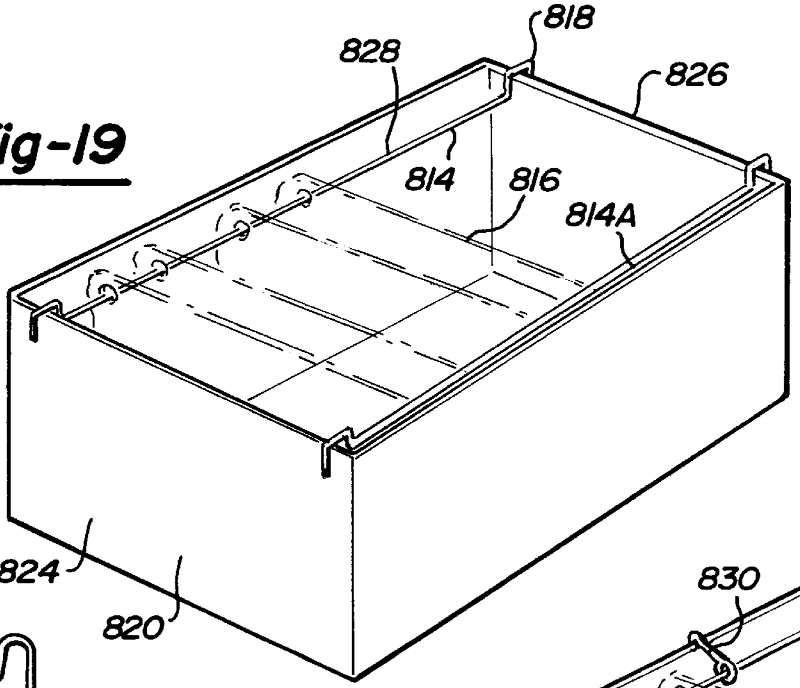
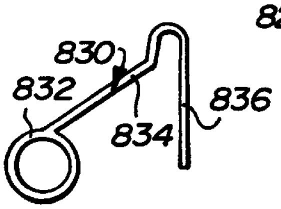
Fig-20A
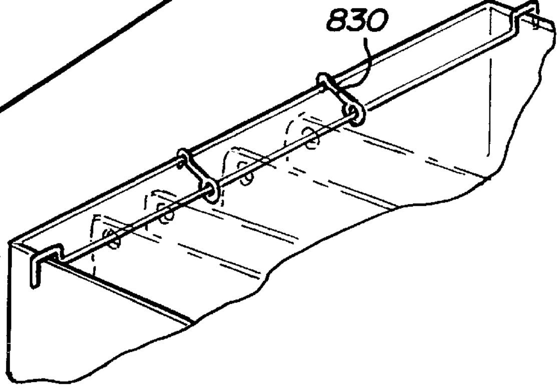
Fig-20

Fig-21
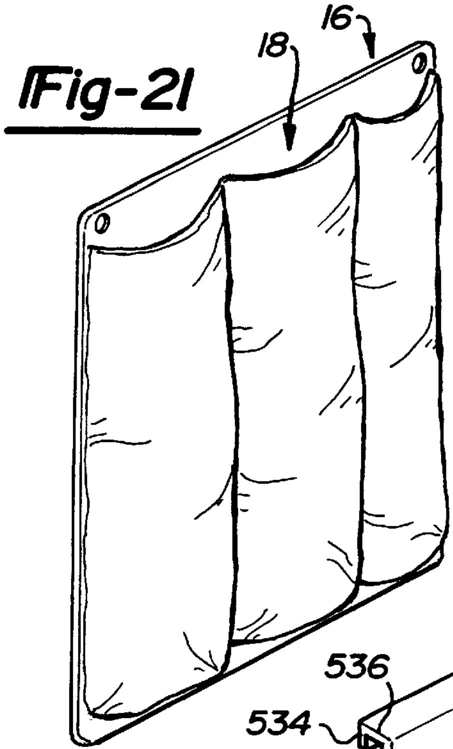
Fig-22
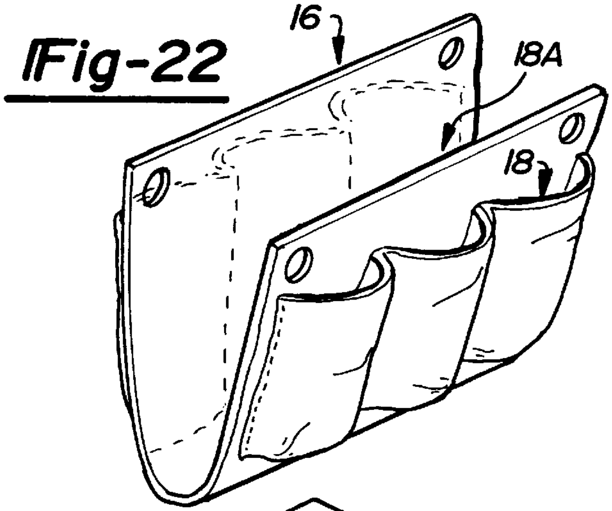
Fig-24
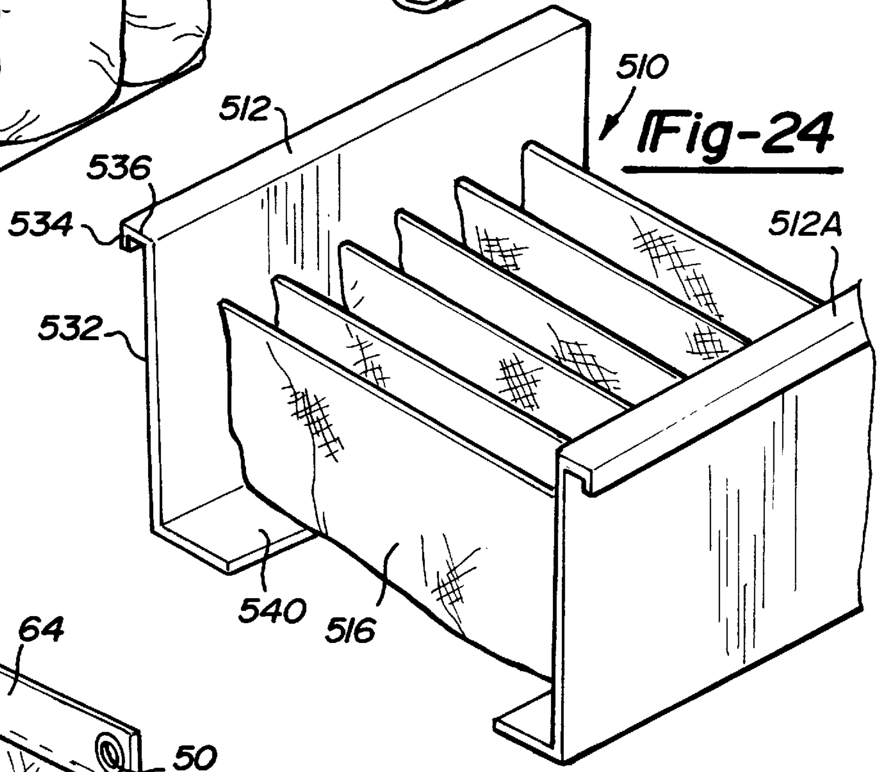
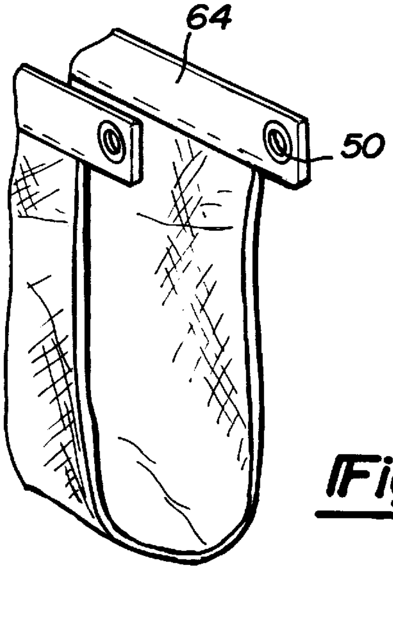
Fig-23

PACKAGING SYSTEM

This is a continuation of U.S. patent application Ser. No. 08/551,628, filed Nov. 1, 1995, now abandoned.

BACKGROUND OF THE INVENTION

The present invention relates to packaging systems, and more particularly, to several related embodiments of packaging systems that enable structures such as containers, boxes, bins or racks, for example, whether transportable or non-transportable, to be converted into an apparatus for supporting articles of varying geometries in a suspended manner.

While numerous containers are known for storing articles or objects during periods of non-use or for the transportation of various articles or objects, heretofore packing systems which are universal in nature, i.e. capable of converting any suitable support structure including containers, bins, racks, etc., into an apparatus for supporting a variety of objects of varying geometries in a suspended manner are not believed to be known. Additionally, the present invention includes various receptacles which are particularly suited for loading and unloading of objects through openings preferably provided along the top edges thereof.

Often, it is desirable to maintain objects in a suspended manner to protect the objects and limit the likelihood that they will be damaged and become marred when stored in proximity to other objects. Further, it is often desirable to maintain objects in individualized compartments for ready retrieval and easy accessibility. Still further, it is often advantageous to maintain objects in a suspended manner in individualized compartments as more objects can be placed in a container in close proximity to one another without fear of them becoming damaged or scratched as would occur if the objects came in contact with one another.

Of the devices which are known for suspending articles during periods of storage, the devices generally tend to be useful only with regard to a specific type of container. For example, U.S. Pat. No. 5,226,734 which issued Jul. 13, 1993, to Scott et al., discloses a hanger bag assembly which is useful in association with a pair of support rails such as those occurring in a file cabinet. Still, other hanging folders are known which relate to hanging file folders such as those described in U.S. Pat. Nos. 4,475,657 (Albery); 3,684,340 (Kirkorian); 2,329,201 (Jonas); and 2,325,317 (Hanna). Other patents which may provide an understanding of the state of the art include U.S. Pat. No. 4,730,736 to Lindquist et al., which discloses a hanger strip for envelopes containing flat articles; U.S. Pat. No. 1,217,243 to Tucker et al., which discloses a map storage system wherein a suspension rod for hanging maps is provided with index slips arranged so as to enable one to rapidly sort through the hanging maps; U.S. Pat. No. 4,590,610 to Rhyne which discloses a hanging product display package wherein a garment bag or the like is suspended from a rigid plastic "coathanger;" U.S. Pat. No. 492,163 to Ives which discloses a hanger arrangement for moth-proof bags and U.S. Pat. No. 4,848,928 to Ausnit which discloses a package with a "ZIPLOC" type closure provided at a location intermediate the edges thereof.

SUMMARY OF THE INVENTION

While structures are known for generally maintaining objects in a suspended manner, they are specific in nature and none of the aforementioned structures relate to a packaging system that is universal wherein the packaging system is fully adaptable and generally useful with a wide variety of different support structures including, but not limited to, various containers, bins or racks.

According to one embodiment of the present invention, the packaging system includes at least one substantially flexible elongated hanger bar profile disposable over an edge of a structure such as a container, bin or rack in a form fitting manner or press fit relationship. The hanger bar profile is preferably provided with an upwardly extending wall for supporting a hanger bar which extends across the opening of the container. Extending from the one or more hanger bars are one or more generally compliant receptacles which are designed to receive objects of varying geometrical configurations and which are orientated to receive objects through an opening provided along the top edge of the receptacle.

Under another embodiment of the present invention, the packaging system includes two or more substantially rigid hanger bar profiles attachable over or along an edge of a support structure such as a container, bin or rack. While numerous hanger bar profile embodiments will hereinafter be presented, in general, each hanger bar profile includes a body portion which is attachable to a support structure. Extending from the body portion is an upwardly and inwardly extending lower terminal end which supports a hanger bar. The terminal end can have a variety of forms and sizes such as an overall arcuate or U-shape, for example. In addition to the hanger bar profile, hanger bars are employed which are attachable to a hanger bar profile. One or more generally compliant receptacles are also employed which suspend either directly or indirectly from the hanger bars. Preferably, the compliant receptacles are orientated such that objects can be inserted and removed through one or more openings provided along the top edge of the receptacle.

Under yet another embodiment of the present invention, the packaging system includes a combination profile and receptacle assembly. According to this embodiment, the receptacle is sewn or otherwise attached directly to the body of the profile thereby eliminating the need for the hanger bars. The profile differs from other embodiments in that the body portion no longer includes an upwardly and inwardly extending lower terminal end. Further, the body of the profile may be sufficiently rigid so as to be useful both as a free-standing element or attachable over a support structure such that the combined profile and receptacle can be suspended by the support structure. Typically, the receptacle is made from a reinforced film or other flexible material which has separate and distinct compartments which are orientated for receiving objects of varying geometries through one or more openings provided along the top edge thereof.

According to another embodiment of the present invention, the packing system includes one or more elongated hanger bars and one or more receptacles which are suspended from the hanger bars, wherein the hanger bar profiles are not required. The hanger bars can be formed such that the terminal ends extend downwardly or alternatively, have a downwardly extending inverted U-shaped leg. The inverted U-shaped leg allows the elongated body of the hanger bar to be inset from the top of the container so as to not interfere with the stackability or interlocking of the containers or the operation of a lid when employed. The hanger bars having downwardly extending legs are, thus, attachable over the edge of a support structure or, optionally, through apertures located along the body of the structure such that the distal leg serves to preclude lateral displacement of the hanger bars as will be described in greater detail below. The downwardly extending end of the hanger bar may also be inserted through the top perimeter of the container, and/or through the surface of a profile including a stacking rail. The receptacle or receptacles useful in association with the aforementioned packaging systems can vary dramatically depending largely upon the end user's specific needs.

According to yet another packaging system of the present invention, the packaging system includes a support structure such as a container, bin or rack which includes a pair of opposed guide tracks for receiving the terminal ends of one or more hanger bars. Each hanger bar includes an enlarged head located along the terminal ends which are received within channels provided along the guide track. Thus, the hanger bars and, ultimately, the receptacles can be positioned at various locations along the guide tracks.

The present invention also relates to methods of converting different sized support structures such as containers, bins or racks into a packaging system or apparatus for supporting one or more objects of varying geometries in a suspended manner. Further, the receptacles employed as part of the packaging system are preferably orientated such that the articles may be loaded or unloaded through an opening provided along the top edge of the receptacle.

According to the first method, at least two opposing flexible hanger bar profiles are press fit over the edge of the container, bin or rack for receipt of elongated hanger bars extending across the opening of the container, bin or rack. Prior to attaching the elongated hanger bars to the hanger bar profile, one or more generally compliant receptacles are attached to the hanger bars. Thereafter, the hanger bars are secured to the flexible hanger bar profile such that the one or more receptacles extend downwardly from the hanger bars to receive objects and to maintain the objects in a suspended manner.

According to a second method, at least two opposing hanger bar profiles of varying descriptions are attached to the container, bin or rack generally along a peripheral edge. Thereafter, one or more of a wide variety of receptacles are attached to hanger bars either directly or indirectly using connectors, and the hanger bars are attached to the hangar bar profile. Thus, as with each of the embodiments of the present invention, the one or more receptacles are maintained in a suspended manner for receipt of an article of manufacture through the top opening of the receptacle. Upon attachment of the hanger bar to the hanger bar profile or the connectors to the hanger bar, the receptacles are suspended in a manner useful for receiving objects, with the receptacles ideally being orientated to allow for the loading and unloading of objects through the top opening of the receptacles.

According to a third method of the present invention, one or more receptacles are attached directly or indirectly to a hanger bar and thereafter, at least two opposed hanger bars are attached directly to the container, bin or rack such that the one or more receptacles are again maintained in a suspended manner orientated for loading and unloading objects through an opening provided along the top edge of the receptacle.

Under a fourth method, preexisting containers, bins or racks are converted into an apparatus for containing one or more articles of manufacture in a suspended manner, through the use of a unitary hanger bar profile and receptacle assembly. To carry out the method, first and second hanger bar profiles are secured to an exposed surface of the container, bin or rack whereby upon connecting the hanger bar profiles, the integral receptacle which extends between the first and second hanger bar profiles is suspended and ready to receive articles through the top opening of the receptacles.

As alluded to earlier, while numerous receptacle embodiments made from a wide variety of materials and styles are contemplated as being within the scope of the present invention, ideally, the receptacles will be compliant in nature such that objects having varying geometrical configurations can be housed with any given receptacle of suitable size. The receptacles are specifically designed to hold a wide assortment of objects or components of varying sizes, shapes and weights in a manner to protect the objects contained therein and to prevent the objects from coming into contact with one another, thus preventing scratching and marring. The suspended receptacles enable the objects to be maintained in close proximity to one another by maintaining them in separate compartments, thus, greatly increasing part density for a given packaging system and providing a more economical package on a unit basis. The suspended receptacles are also designed so that they may be adjusted or easily relocated along the respective hanger bar or hanger bar profile to enhance logistics.

Accordingly, a primary object of the present invention is to provide a packaging system which is useful in association with various structures including containers, bins and racks for example, whether transportable and non-transportable, wherein the containers, bins or racks are adapted for maintaining objects in a suspended manner. Ideally, the receptacles will be orientated for loading and unloading of objects through one or more openings provided along the top edge of the receptacle.

Another object of the present invention is to provide a packaging system which functions as either a temporary or permanent storage device for housing a variety of products and objects of varying sizes, shapes and geometries.

Another object of the present invention is to provide a packaging system which converts a container into one useful for shipping products throughout the transportation cycle from vendor to intermediary to end user.

Numerous other objects and advantages of the present invention will become apparent from a review of the following detailed description in view of the accompanying drawings in which:

BRIEF DESCRIPTION OF THE DRAWINGS

FIG. 3 is a side elevation view illustrating an object of irregular geometrical shape contained within a compliant pouch;

FIG. 3A is a sectional view taken along line 3A—3A of FIG. 3 illustrating a reinforced aperture through which a supporting rod extends;

FIG. 4 is a sectional view taken along line 4—4 of FIG. 1 illustrating the hanger bar profile attached over the peripheral edge of the container with a first end of the rod embedded within an upwardly extending wall of the hanger bar profile;

FIG. 5 is an exploded perspective view of an alternative packaging system according to the teachings of the present invention;

FIG. 5A is a broken away sectional view of a container used in the packaging system of FIG. 5;

FIGS. 8A—8F are side elevation views of alternative hanger bar profile embodiments useful in certain of the packaging systems of the present invention;

FIGS. 9A and 9B are side elevation views of alternative hanger bar embodiments useful in certain of the packaging systems of the present invention;

FIG. 13 is a perspective view of an alternative packaging system embodiment including a pair of spaced apart profiles having an integral receptacle extending therebetween;

FIG. 14 is a perspective view of an alternative packaging system embodiment;

FIGS. 15A—15D are perspective views illustrating composite receptacle embodiments made from various materials;

FIG. 16 is a perspective view illustrating a receptacle embodiment having separate closures for separate sections;

FIG. 17 is a perspective view of another alternative packaging system assembly according to the teachings of the present invention;

FIG. 18 is a perspective view of an alternative receptacle embodiment in the form of a convoluted web;

FIG. 19 is a perspective view of another packaging system assembly embodiment in accordance with the teachings of the present invention;

FIG. 20 is a partial perspective view of the packaging system of FIG. 19 including fasteners which preclude excessive lateral movement of the hanger bars;

FIG. 20A is a side elevation view of a fastener illustrated in FIG. 20;

FIG. 21 is a perspective view of an alternative receptacle embodiment having elongated pockets;

FIG. 22 is a perspective view of an alternative receptacle embodiment having multiple external pockets and a single internal pocket;

FIG. 23 is a perspective view of an alternative receptacle embodiment having a reinforced binding along the top edges of the receptacle;

FIG. 24 is a perspective view of a packaging system embodiment including a pair of spaced apart profiles having an integral receptacle extending therebetween;

DETAILED DESCRIPTION OF THE PREFERRED EMBODIMENT

Figure 1:
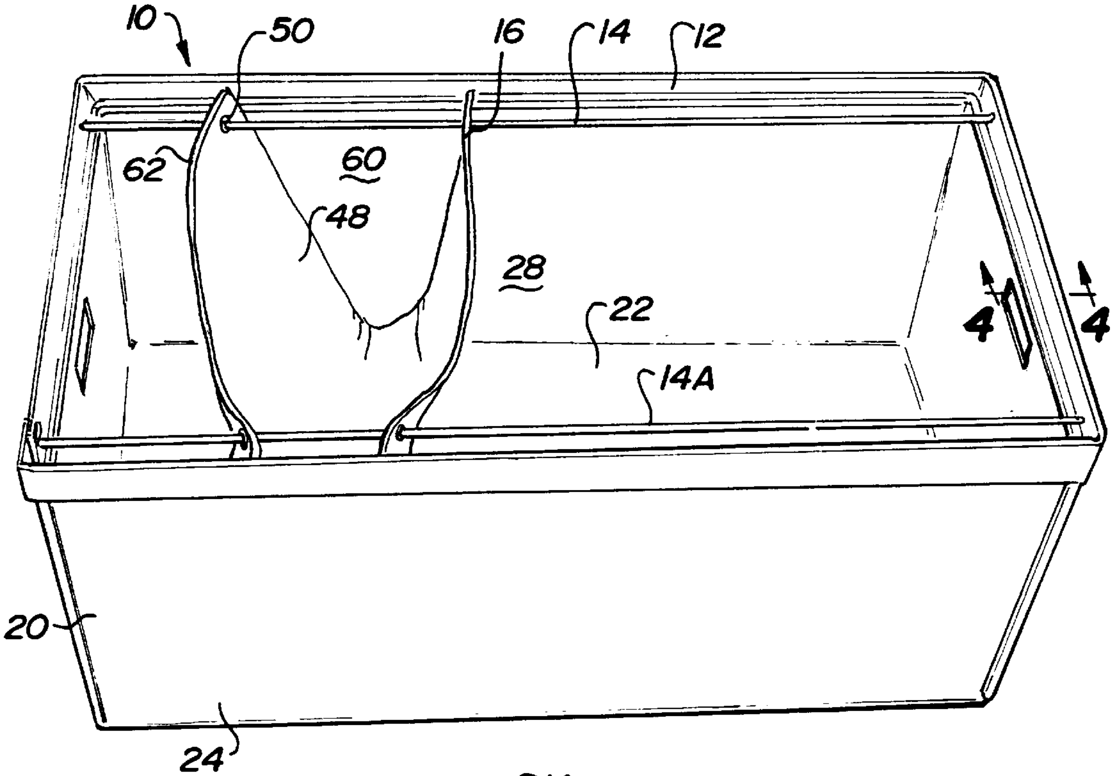
FIG. 1 is an assembled perspective view of a packaging system according to the teachings of the present invention.
Figure 2:
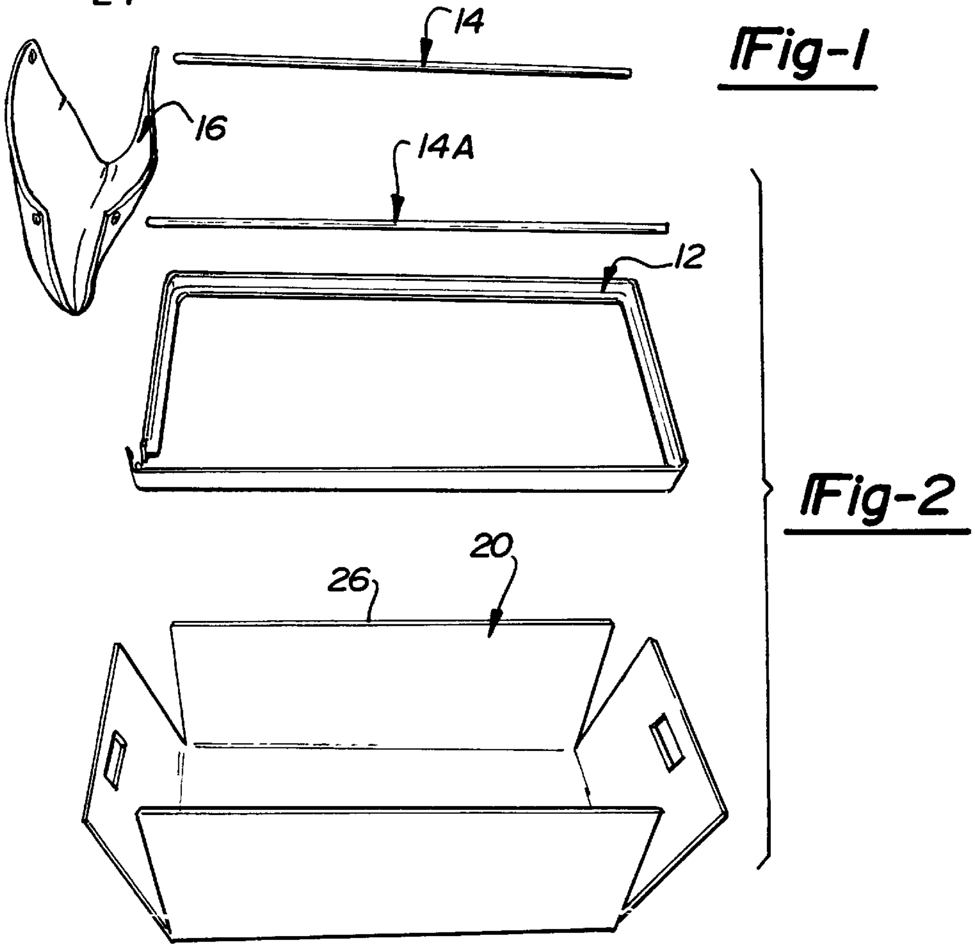
FIG. 2 is an exploded perspective view of the packaging system illustrated in FIG. 1.

Referring to FIG. 1, an assembled perspective view of a first packaging system embodiment in accordance with the teachings of the present invention is shown. The packaging system 10 generally includes as its major components at least one hanger bar profile 12, two or more elongated rods 14, otherwise referred to herein as hanger bars, and one or more generally compliant receptacles, 16, otherwise referred to herein as pouches.

The packaging system is, as mentioned, useful in association with a number of different support structures including, but not limited to, containers, bins, tote boxes, or racks, among others. For simplicity, and without intending to be limiting, each of the packaging system embodiments set forth herein will be described as being useful in association with a container to explain the functionality of the present invention.

The container 20 can have varying geometrical constructions, including for example an overall rectangular or cylindrical shape, and generally includes a bottom wall 22, one or more side walls 24 depending on the overall shape of the container. The container 20 also includes a peripheral edge 26 disposed along the one or more side walls as best shown in FIG. 1, which defines an opening 28 through which objects are inserted into and removed from the receptacles.

While the container is generally not considered to be an element of the packaging system according to this embodiment, it should be noted that the container can be formed from a variety of different materials and have a wide assortment of constructions. For example, the container can be formed from molded plastic fabricated from corrugated plastic, made from metal or steel, have an open grid pattern such as that found in a wire mesh container, or be constructed from an expendable material such as wood or corrugated paper. Likewise, the container can be preformed to the desired shape or can be fabricated into the desired shape by assembling or folding the various panels or walls. The container may also be transportable, or non-transportable, stackable or free standing, collapsible, or include special features such as drop gates or stacking rails.

The hanger bar profile 12, as illustrated most clearly in FIG. 4, preferably is formed from a plastic or elastomeric material and typically includes a body 30 having first and second legs 32 and 34, respectively, separated by a web 36 to define a channel 38 for receiving the peripheral edge 26 of the container 20. Ideally, the hanger bar profile 12 according to the embodiment of FIG. 1 will be an one-piece extruded member which is sufficiently flexible so as to be applied over the peripheral edge of the container and yet be rigid enough to provide structural support to the container at least along the top edge. The hanger bar profile 12 also preferably includes an inwardly extending shelf 40 disposed transversely to the first and second legs 32 and 34 for supporting the one or more elongated hanger bars 14 upon attachment to the hanger bar profile. Extending upwardly from the body 30 is a wall 42 having a groove or detent 44 within which the terminal end 46 of the one or more hanger bars 14 seat upon attachment as illustrated in FIG. 4.

The one or more hanger bars 14 generally extend along the length or width of container 20 such that the compliant receptacles 16, otherwise referred to herein as pouches, extend into the container 20 in a suspended manner. Preferably, a pair of spaced apart hanger bars 14 and 14A are disposed in proximity to opposing side or end walls of the container to support one or more receptacles 16. The receptacles 16 generally extend in a plane which is a transverse to the longitudinal axes of said pair of hanger bars 14. The hanger bars 14 and 14A may be made from any one of a number of different materials including for example sold metal rods, metal tubes, and rigid plastics, provided the material is sufficiently strong to support the weight of the objects contained within a designated receptacle, and does not deflect or bend to such a degree to negatively impact the suspension or desired movement of the receptacles along the hanger bars.

The compliant receptacles or pouches 16 as shown in FIGS. 1–4 are generally in the form of a rectangular shaped sheet 48 made from any one of a number of different materials including reinforced film, flexible plastic, fabric, or a soft plastic laminate, for example. Disposed in proximity to each corner 48 of the sheet is an aperture 50 through which the hanger bars 14 or 14A extend. Preferably, each aperture 50 will be reinforced with a durable ring 52 or other such structure to assist in supporting the object or objects contained within the compliant pouch. As will be described in greater detail below, still numerous other compliant pouch embodiments are contemplated as being both interchangeable and useful in accordance with the teachings of the present invention.

Assembly of the packaging system embodiment 10 illustrated with reference to FIGS. 1–4 will now be described in greater detail. Initially, the hanger bar profile is applied over two opposed peripheral edges of the container 20 by press fitting the hanger bar profile such that the downwardly extending legs 32 and 34 extend along opposite surfaces of the respective side or end walls. As noted, the hanger bar profile is preferably made from a plastic or elastomeric material which is flexible enough to be easily applied over the side or end walls of the container in a tight fitting manner and yet rigid enough to support the weight of objects contained in the various receptacles.

Once the hanger bar profile 12 has been applied over the opposing walls 24 of the container, one or more compliant pouches 16 are attached to the hanger bars 14 and 14A by inserting the hanger bars through the reinforced apertures as shown in FIG. 3A. Thereafter, the hanger bars 14 and 14A are attached to the hanger bar profile 12 by inserting the ends of the hanger bars into the slots provided along the upwardly extending wall of the hanger bar profile.

Once the hanger bars 14 and 14A have been attached to the hanger bar profile 12, the compliant pouches 16 extend in a suspended manner into the container 20 and are orientated such that objects can be placed into and removed from the pouches through the opening 60 provided along the top edge 62 of the compliant pouches. As noted, the compliant pouches are especially useful for containing objects of varying geometrical shapes and/or objects which require special handling to preclude marring and scratching. Thus, as should clearly be recognized by those skilled in the art, the present invention offers a method for converting virtually any structure having an edge or other similar free surface into a structure capable of protecting and supporting articles in a suspended manner.

Referring to FIG. 5, an alternative packaging system embodiment in accordance with the teachings of the present invention is shown in a blown apart perspective view. In view of the similarities between the various packaging system embodiments presented herein, like reference numerals will be utilized for like elements. Thus, as shown in FIG. 5, the packaging system 10 generally includes a continuous hanger bar profile 12 or two hanger bar profiles (not shown) having the same cross-sectional geometry as the continuous profile. The hanger bar profile 12 is preferably formed from a flexible yet relatively rigid thermoplastic material or metal capable of supporting the weight of the objects contained within the one or more receptacles 16. The hanger bar profile 12 (or profiles where two opposing profile sections are employed) has a substantially identical cross-sectional geometry as the embodiment of FIGS. 1 and 2 excepting that the shelf 40 does not typically extend beyond the inner surface of leg 32. The shelf 40 does, however, include a plurality of holes 54 through which the terminal ends 46 of the hanger bars extend. As illustrated, the hanger bars employed in the embodiment of FIG. 5 typically have an inverted U-shaped terminal ends which extend above the body portion of the hanger thereby allowing the body of the hanger bars to extend below the level of the shelf 40. In addition to the holes provided along the shelf of the hanger bar profile, the container walls 24 are preferably corrugated as shown in FIG. 5A, thereby allowing the ends of the hanger bars to be inserted into a space 56 provided between the inner and outer walls 24A and 24B of the container and dividers 24C. Thus, the corrugated spaces assist in precluding lateral movement of the hanger bar along the container wall.

Figure 6:
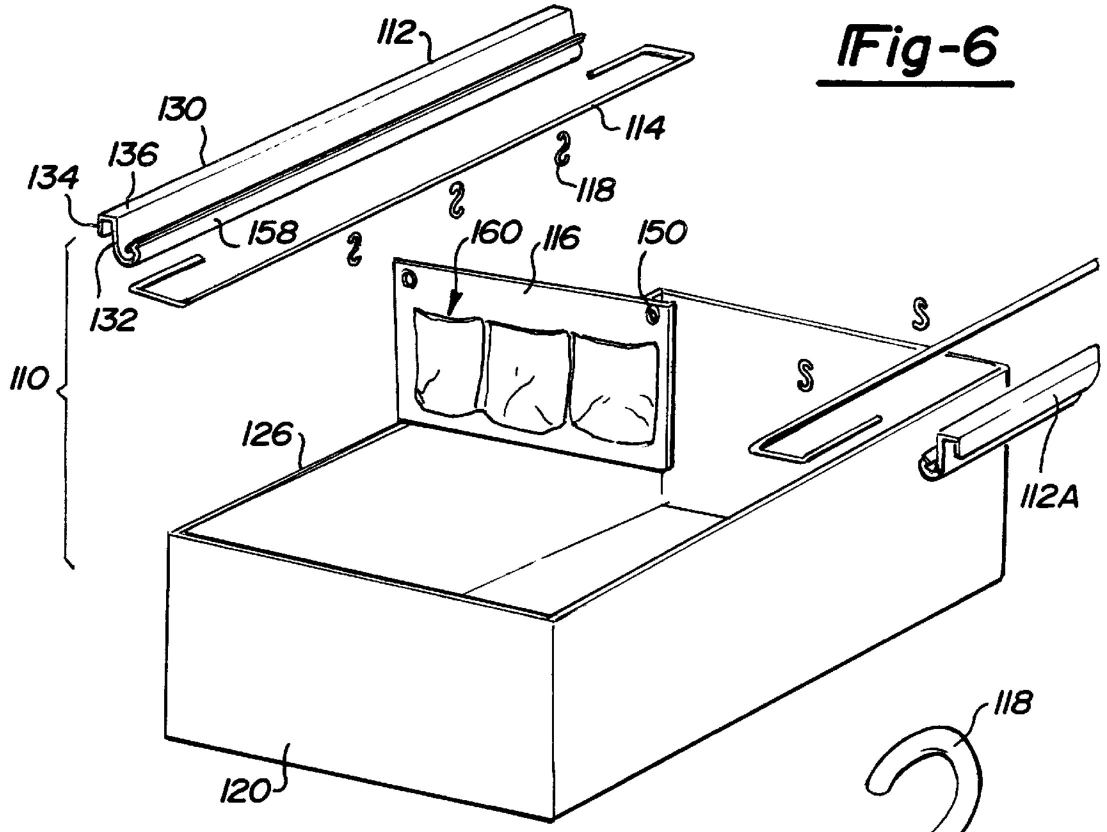
FIG. 6 is a blown apart perspective view of an alternative embodiment of the packaging system according to the teachings of the present invention.
Figure 7:
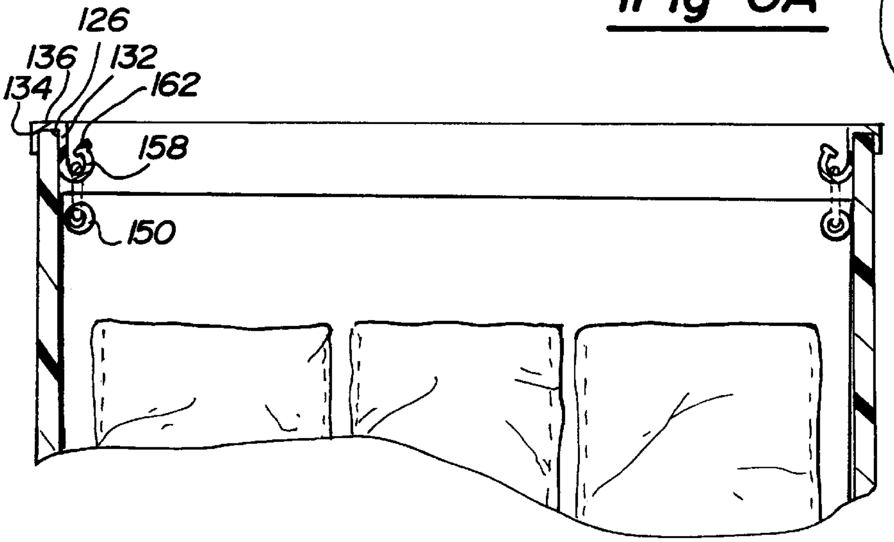
FIG. 7 is a assembled side elevation view of the packaging system of FIG. 6 wherein the receptacle is attached directly to the hanger bars, thus, eliminating the connectors.

Referring to FIG. 6, an alternative packaging system embodiment in accordance with the teachings of the present invention is shown in a blown apart perspective view. The packaging system 110 generally includes a pair of spaced apart hanger bar profiles 112 and 112A disposable over the peripheral edge 126 of opposing side or end walls. The hanger bar profiles 112 and 112A are preferably formed from a flexible yet relatively rigid thermoplastic material or metal capable of supporting the weight of any objects contained within the one or more receptacles 116. Again, the hanger bar profiles 112 and 112A typically include a body 130 having first and second legs 132 and 134, respectively, separated by a web 136 which fits over and receives the peripheral edge 126 of the container 120 as shown most clearly in FIG. 7. Extending inwardly from the first leg 132 is an incurved terminal end 158 which serves to support a hanger bar 114, or optionally, a plurality of connectors 118 for supporting one or more compliant pouches 116. At the distal portion of the incurved terminal end 158 is an angled stop or tongue 162 which helps keep the hanger bar in place within the of the hanger bar profile.

The hanger bars 114 and 114A as shown in FIGS. 6, 9A and 9B include an elongated body portion 164 having curved ends 166 and 166A which seat within the incurved terminal end 158 of the hanger bar profile upon attachment. Additionally, where it is contemplated that heavier objects will be maintained in a suspended manner, it may be desirable to include one or more support arms 168 such as those shown in FIG. 9B which assist in providing structural support to the hanger bars. As with the terminal ends of the hanger bars, the support arms 168 would also seat within the hanger bar profile by extending through slots 170 as shown in FIG. 9B positioned along the length of the hanger bar profiles, and aligned with the support arm 168.

Figure 6A:
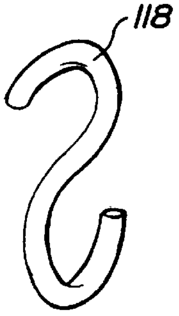
FIG. 6A is a perspective view of a connector useful in association with packaging system embodiments of the present invention.

To suspend one or more pouches 116 indirectly from the hanger bar profiles, the pouches again include at least a pair of spaced apart apertures 150 disposed along the upper corners thereof for attachment to the hanger bars 114. As illustrated most clearly in FIG. 6A, connectors 118 which are somewhat S-shaped may be utilized to engage the apertures of the pouch along one end and hooked over, or otherwise attached along a first end to the respective hanger bars to suspend the pouches in an orientation which allows for unloading and loading of objects through the openings 160 of the pouch. As previously noted and illustrated in FIG. 7, the pouch may also be attached directly to the hanger bars without employing the connectors.

Referring to FIGS. 8A–8F, exemplary embodiments of various hanger bar profiles useful in accordance with the teachings of the present invention are illustrated. In general, each hanger bar profile includes a body 130 and a lower incurved terminal end 158 which extends inwardly and upwardly. The terminal end 158 which is shown to be arcuate in FIGS. 8A–8E and relatively square in FIG. 8F defines an open area 172 into which the ends of the hanger bars extend. Referring specifically to FIG. 8A, the body portion 130 of the hanger bar profile, which does not include a web for attachment over the edge of a support structure, is applied directly to the support structure along the body portion. Referring particularly to FIG. 8B, the hanger bar profile 112B includes first and second legs 132 and 134 separated by a web portion 136 that is easily positioned over the peripheral edges of a container in a detachable or friction fit manner. The width of the web can be varied to accommodate virtually any container wall thickness. In addition to the friction fit, the hanger bar profile can also be secured with fasteners or adhesives. Extending upwardly from the web portion 136 is a wall 142 which serves as a blocking wall for stacking containers. The body portion of the hanger bar preferably extends downwardly along an inner wall of the container. Preferably, the distal portion of the terminal end 158 is provided with a downwardly angled tongue 162 designed to maintain the hanger bar ends within the area 172.

As the terminal end of the hanger bar is placed upon the face 174 of the tongue 162, the hanger bar is encouraged to move downwardly along the face toward the body portion 130 and ultimately into the open area 172 defined by the terminal end 158 and tongue 162. Preferably, the terminal end and particularly the angled tongue will be somewhat flexible such that upon generating a downward force on the hanger bar to insert the terminal ends of the hanger bar within open area 172, the tongue will flex downwardly, thus providing sufficient space to allow the terminal ends of the hanger bar to pass into the open area. Once the terminal ends of the hanger bar have snapped past the tongue, the tongue returns to its original position such that a portion of the tongue extends over the open area 172 to preclude the undesired displacement of the hanger bar after attachment. As an added feature, the end portion 176 of the tongue extends into the open area and provides a corner which serves as a stop or catch to help maintain the hanger bar within the open area of the hanger bar profile. As with the upper end, the dimensions of the lower terminal end 158 can be varied to accommodate different hanger bar thicknesses.

Referring particularly to FIG. 8C, an alternative hanger bar profile 112C, referred to herein as an L-shaped hanger bar profile, is illustrated. The hanger bar profile 112C is substantially similar to that shown in FIG. 8B except that the hanger bar profile eliminates the outer downward leg. Thus, the hanger bar profile can be attached to a support structure such as a container along either body portion 130 or along the web segment 136, or both. Again, the hanger bar profile 112C contains an incurved terminal end 158 which has a downwardly angled tongue 162 to assist in the insertion of the hanger bar within the open area 172.

Referring to FIG. 8D, an alternative hanger bar profile 112D is illustrated. According to this embodiment, the hanger bar profile includes a substantially flat linearly extending body portion 130 and the incurved lower terminal end 158. In addition, the hanger bar profile 112D includes a downwardly and outcurved terminal end 136D located along the top end of the body portion which is particularly suited for attachment over arcuate shaped edges. The downwardly and outcurved terminal end 136D may vary in width to accommodate different wall thicknesses of a container.

Again, it is preferable that the downwardly extending outcurved terminal end is somewhat flexible to accommodate support structures of varying dimension in the open area 178 defined by the downwardly extending outcurved portion. By way of example, and in a non-limiting manner, it is contemplated that the hanger bar profile 112D as illustrated in FIG. 8D would be ideally suited for use in association with a metal rack or other similar structure.

Referring to FIG. 8E, still another alternative hanger bar profile embodiment is presented. The hanger bar profile 112E differs from the other embodiments previously set forth in FIGS. 8A–8E in that the structure is formed with a first downwardly extending leg 134E which is angled toward the body 130 of the hanger bar profile. The leg 134E is preferably outwardly displaceable such that the hanger bar profile can be retrofit over an edge of a container or other such support structure wherein the space between the terminal end 158E of the leg 134E and the outer surface of the body portion will vary depending upon the thickness of the support structure over which the hanger bar profile is attached. An added feature of the hanger bar profile of FIG. 8E is that the leg 134E also seats firmly against the container upon attachment to preclude the undesired displacement of the hanger bar profile from the container.

Referring to FIG. 8F, an alternative hanger bar profile embodiment 112F includes both an incurved upwardly extending lower end 158 and an outcurved downwardly extending upper end including a first leg 134F, a second leg 132F and a web 136F. As should be understood by those skilled in the art, based upon a review of FIGS. 8A–8F, the hanger bar profiles can have a variety of different shapes and sizes.

Figure 10:
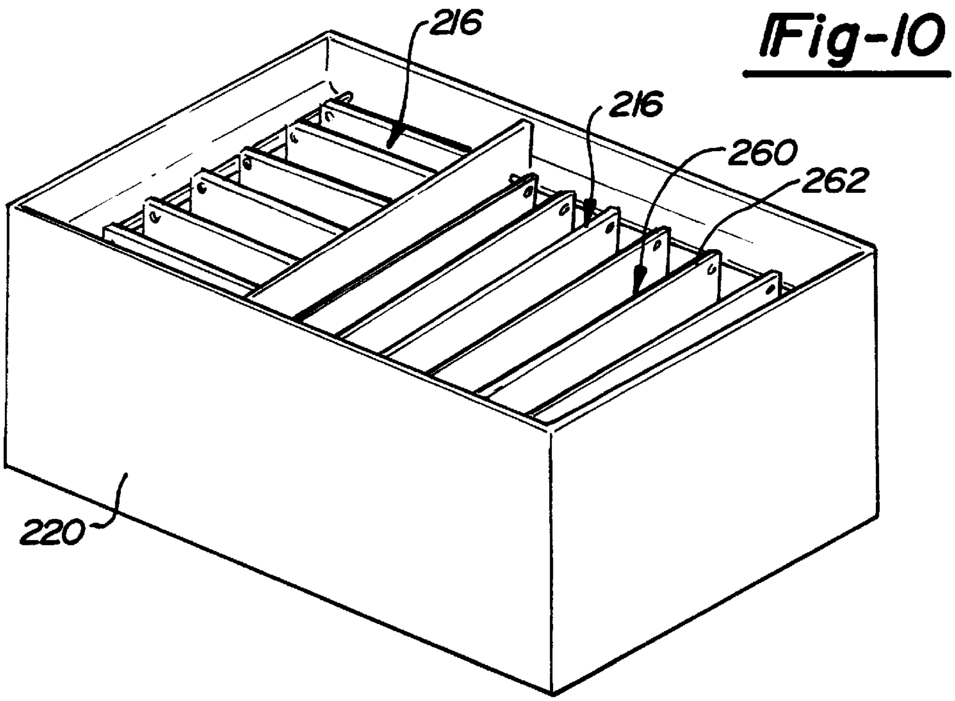
FIG. 10 is a perspective view illustrating a container having multiple packaging systems contained therein.

Referring to FIG. 10, an exemplary embodiment of a container 220 is shown to be adapted to receive objects in a suspended manner. The container 220 includes two or more rows of pouches 216 arranged in different directions. Thus, it should be recognized that a single container can be utilized to house multiple packaging system embodiments. As with many of the receptacles included herein, the pouches 216 preferably include an opening 260 located along the top edge 262 for inserting objects into and removing them from the receptacles.

Figure 11:
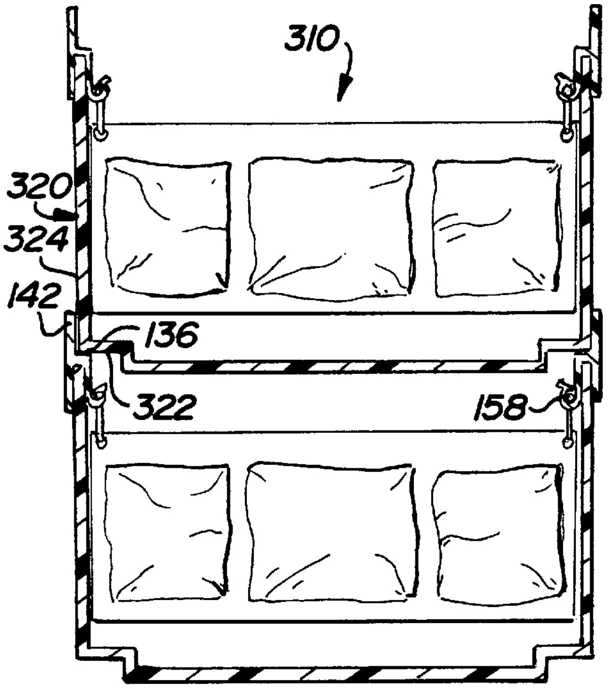
FIG. 11 is an assembled side elevation view illustrating a packaging system according to the teachings of the present invention for maintaining a plurality of containers in a stacked relationship.

Referring to FIG. 11, a packaging system embodiment 310 is illustrated which employs a pair of opposing hanger bar profiles geometrically identical to that shown in FIG. 8B. As illustrated, the bottom portion 322 of one container 320 comes to rest upon the upper surface of the hanger bar profile web 136. Additionally, the side wall 324 of the container is held in place by the upwardly extending wall 142 of both hanger bar profiles. Thus, by utilizing the hanger bar embodiments illustrated in FIG. 11, multiple containers can be stacked on top of each other since the upwardly extending incurved end 158 is positioned well below the bottom surface of the adjacent container.

Referring to FIG. 13, an alternative packaging system embodiment 410 for adapting a support structure such as a container, bin or rack into an apparatus for supporting one or more objects in a suspended manner is illustrated. According to FIG. 13, the packaging system embodiment 410 includes a unitary profile and receptacle assembly. The packaging system 410 includes a pair of opposing spaced apart profiles 412 and 412A defined by first and second spaced apart legs 432 and 434 connected by a web 436, wherein the web is designed to receive the edge of a container as previously described in the discussion of a U-shaped hanger bar profile. The receptacle 416 includes a sheet of material or film 480 which extends downwardly from the first legs of each profile with a pouch portion 482 extending therebetween. Thus, to utilize the packaging system embodiment 410, the profiles 412 and 412A with integrally attached receptacle need only be positioned over the edge of a support structure (not shown) such that the integral receptacle is suspended freely within the confines of the support structure.

Referring to FIG. 24, a packaging system embodiment 510 substantially similar to that shown in FIG. 13 is provided. The packaging system 510 again includes an unitary profile and receptacle assembly which comprises a pair of spaced apart opposed profiles 512 and 512A including first and second spaced apart legs 532 and 534 connected by a web 536, wherein the web is designed to be positioned over the edge of a support structure such that the packaging system can be suspended. However, the packaging system 510 differs from the one illustrated in FIG. 13 in that the first legs are continuous and extend downwardly such that the receptacle 516 is attached to and extends between the interior legs of the profiles. Preferably, the interior legs are sufficiently rigid to support the packaging system embodiment whether standing alone or attached over the edge of a support structure. Further, the interior legs 532 preferably include inwardly extending flanges 540 located along the lower ends thereof to assist in maintaining the packaging system in an upright position. As should be recognized by those skilled in the art, the flanges 540 while preferably are generally only necessary where the wall thickness of the legs 532 cannot support the packaging system in and of itself.

Referring to FIG. 14, still another embodiment of a packaging system 610 in accordance with the teachings of the present invention is provided. The packaging system 610 includes a pair of separately attachable substantially identical hanger bar profiles 612 (only one is shown) wherein the incurved upwardly extending lower terminal end 658 of the hanger bar profile is more U-shaped than arcuate. The terminal ends of the hanger bar profiles 612 include a plurality of recesses 650 extending from the upper edge 652 for receiving the hanger bars 614 traversely to the hanger bar profiles. The hanger bars 614 are preferably provided with enlarged heads 618 located along the terminal ends thereof which seat within the open area 672 so that the hanger bars are precluded from becoming detached from the hanger bar profiles unless it is desired.

The receptacle 616 of the packaging system illustrated in FIG. 14 generally is in the form of a sheet reinforced film or similar material which extends between two hanger bars 614 and 614A wherein the sheet includes elongated apertures 648 along the terminal ends thereof for receiving the hanger bars. As should be understood by one skilled in the art, a plurality of receptacles can be employed, wherein the hanger bars can be positioned along consecutive recesses of the hanger bar profile or under circumstances where the depth of the receptacle need not be particularly deep, the hanger bars can be spaced apart skipping one or more recesses upon attachment of the hanger bars to provide a broader open area for receiving articles.

To utilize the packaging system embodiment 610, the hanger bar profiles are positioned over the edge of a support structure such that the lower terminal ends 736 of the respective hanger bar profiles face each other. Thereafter, the hanger bars 614 and 614A are attached to the hanger bar profiles within recesses 650 such that the receptacles suspend downwardly from the hanger bars.

Referring to FIG. 17, an alternative packaging system 710 in accordance with the teachings of the present invention is also provided. Under this embodiment, the hanger bar profiles have been eliminated and replaced by the use of a pair of spaced apart hanger bars 714 and 714A having downwardly extending terminal end portions 718. As shown, the downwardly extending terminal end portions of the hanger bars extend through openings 728 including an edge 726 upon which the hanger bars come to rest provided on opposed walls 724 and 724A of the container 720. The openings may vary in size to accommodate a particular hanger bar, and they may be reinforced to prevent deterioration of the bottom surface of the opening as it comes in contact with the hanger bar and as it is subjected to the weight carried by the hanger bar. Thus, to utilize packaging system illustrated with reference to FIG. 17, one or more pouches 716 are attached to the hanger bars 714 and 714A, respectively, and the hanger bars are inserted through the openings 728 provided on the container, thus, allowing the receptacles to suspend downwardly form the hanger bars.

Referring to FIG. 19, yet another packaging system embodiment is illustrated in accordance with the teachings of the present invention. Hereto, the need for hanger bar profiles have been eliminated by providing specially adapted hanger bars which serve a dual function of supporting the one or more receptacles in a suspended manner and providing a mechanism for attachment over the peripheral edge of a container, bin or rack. The hanger bars 814 and 814A include inverted U-shaped terminal end portions 818 which are positioned over the peripheral edge 826 of the container 820. The elongated body 828 of each hanger bar terminates along the inverted U-shaped terminal ends, thus, providing a stop mechanism when the one or more receptacles 816 approach the ends of the hanger bars. As should be recognized by those skilled in the art, the hanger bars illustrated in FIGS. 17 and 19 are substantially interchangeable depending mainly upon the needs of the consumer. While not illustrated, it should also be noted that the support structure 820 can be provided with notches or recesses extending downwardly from opposing walls 824 to preclude lateral displacement of the hanger bars along the edge of the support structure. Still further, fasteners 830 such as those shown in FIGS. 20 and 20A can be employed to retain the hanger bars within the desired proximity to the sides of the container and to provide additional structural support, if necessary. The fasteners 830 generally include an annular body 832 which is positioned over the hanger bar and an arm 834 which includes a hooked end 836 which is attachable over the edge of the support structure.

Figure 26:
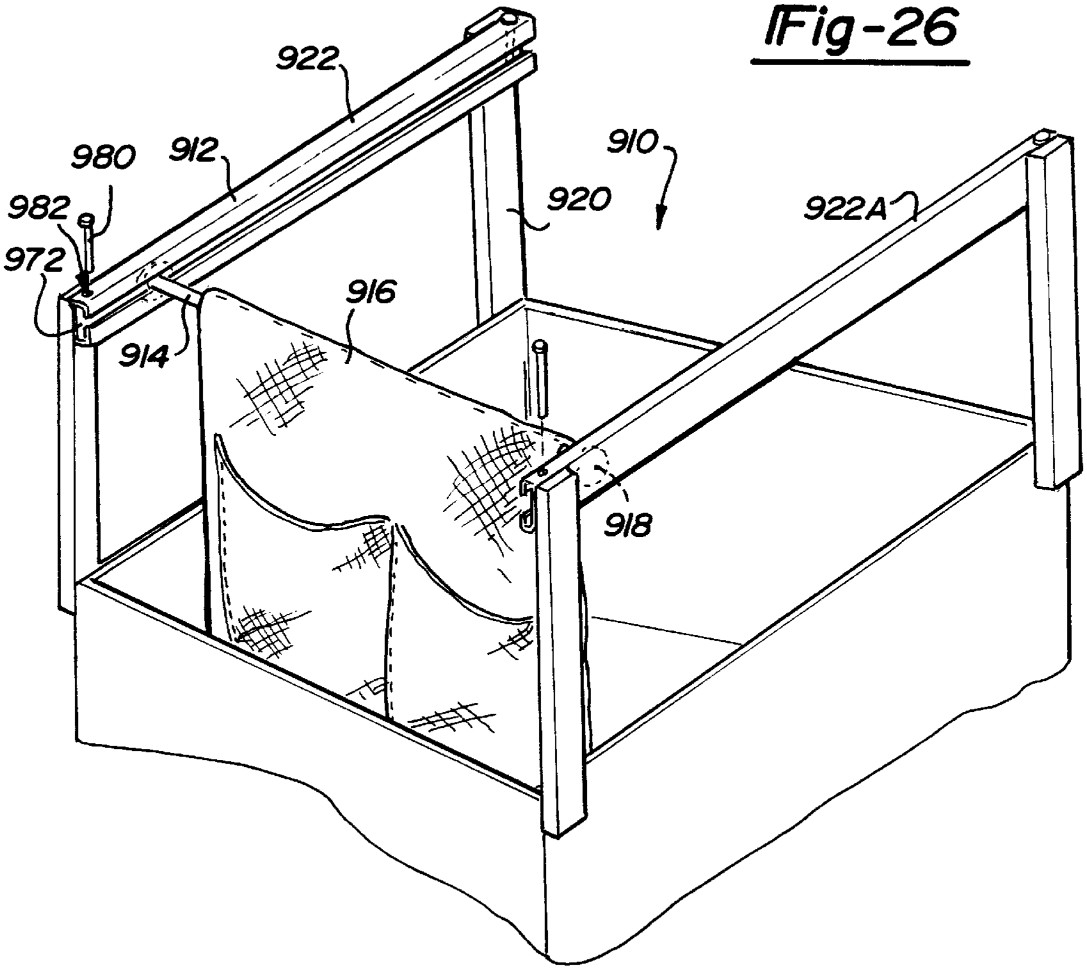
FIG. 26 is a perspective view of still another packaging system embodiment in accordance with the teachings of the present invention.

Referring to FIG. 26, still another packaging system embodiment is illustrated in accordance with the teachings of the present invention. The packaging system 910 includes one or more hanger bars 914, one or more receptacles 916 for receiving articles or objects in a suspended manner and a pair of hanger bar profiles 912 in the form of opposing spaced apart guide tracks 922 and 922A which are substantially C-shaped in cross-section for retaining the hanger bars. As illustrated, the guide tracks 922 and 922A are attachable to the support structure 920, shown here as a plurality of upwardly extending rails, by mechanically fastening, adhesively bonding or welding the guide rails to the support structure. It should be noted, however, that the guide tracks can be retrofit to other support structures such as two opposing walls of a container as well.

The hanger bars again include enlarged heads 918 which are maintained within the elongated channels 972 of the guide tracks to prevent the undesired removal of the hanger bars from the guide tracks. As with the embodiment described with reference to FIG. 14, the receptacles 916 are attached over the hanger bars such that they extend downwardly therefrom. Preferably, the hanger bars 914 can be slid along the guide tracks 922 and 922A so as to make the insertion and retrieval of objects to and from the receptacles easier.

An added feature of the packaging system 910 is that retainer pins 980 are provided at various locations along the guide tracks which extend through apertures 982 into the channels and serve as a stop means for the undesired movement of the hanger bars along the guide tracks. Thus, once the hanger bars, and ultimately the receptacles, are positioned along the guide tracks as desired, the retainer pins 980 can be employed to essentially lock the hanger bars in the desired location. To insert and remove the hanger bars from the guide tracks, the retainer pins must be removed to the end of the guide tracks such that the hanger bars can be slid into or removed from the channel.

Figure 27:
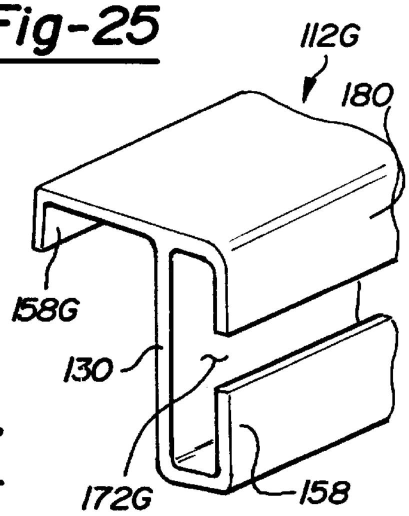
FIG. 27 is a perspective view of an alternative hanger bar profile in accordance with the teachings of the present invention.

Referring to FIG. 27, still another hanger bar profile 130 is illustrated. The hanger bar profile 112G is similar to the one disclosed with reference to FIG. 8F in that the hanger bar profile 112G includes a substantially flat linearly extending body portion, an incurved upwardly extending lower terminal end 158 and an outwardly extending downturned terminal end 158G located along the top end of the body portion. In addition, the hanger bar profile 112G includes an inwardly extending downturned flange 180 which along with the terminal end 158 and body portion 130 provide a C-shaped channel 172G for receiving the head of a hanger bar in the manner described with reference to FIG. 26. Thus, upon disposing a pair of hanger bar profiles 112G over the edge of a support structure opposite each other such that the C-shaped channels face each other, at least one hanger bar and receptacle can be suspended therefrom to retain an object or objects in a suspended state as previously described herein.

As should be recognized by one skilled in the art, the receptacles employed with the various packaging system embodiments set forth herein can take a variety of forms including pouches, slings, sleeves and bags, among others. Likewise, the receptacles can be constructed of different materials or combinations of materials. By way of example, and not wishing to be limited specifically to the receptacle structures described herein, receptacles can be in the form of sheets which are suspended from connectors as shown in FIG. 6 or from hanger bars as shown in FIG. 3, among others. The receptacles generally include apertures 50 located in proximity to the corners of subject receptacle as previously described. The aforementioned receptacle can easily be fabricated into a pouch by sewing the ends closed, as shown in FIG. 16. The sheets utilized to form the receptacles are often made from a reinforced plastic film to provide strength and durability. The sheet may also be reinforced with a binding or a hem 64 including one or more apertures 50 as shown in FIG. 23 to provide additional strength, or contain a gusset or similar device to contain large objects.

Figure 12:
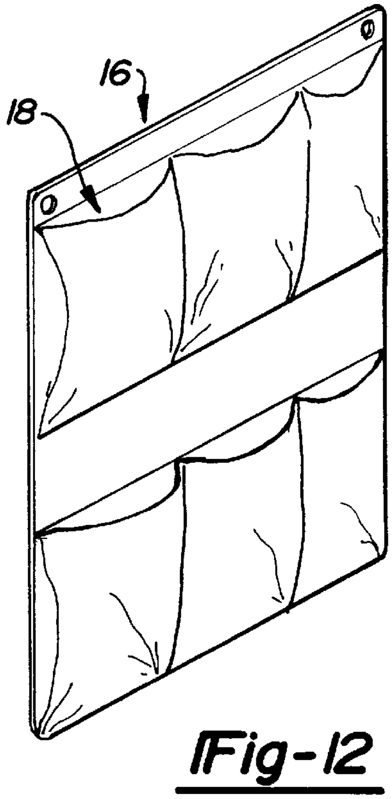
FIG. 12 is a perspective view illustrating an alternative receptacle embodiment having a plurality of segregated pockets.

Receptacles such as that illustrated in FIG. 12 may be utilized wherein the receptacle 16 can be suspended from a hanger bar or hanger bar profile through the provided apertures or from connectors as described above. The receptacle may include a plurality of pockets 18 disposed along one or both sides of the receptacle and further, may include multiple levels of pockets along one or both sides.

As illustrated with reference to FIGS. 15A, the receptacles may be formed from a combination of materials including upper portions 52 and 52A, made from a relatively rigid, high strength material such as a rigid plastic, which are attached to the hanger bars or connectors through the provided apertures and a lower portion 54 which is typically more compliant than the upper portions for hosting one or more objects. As shown in FIG. 15A, the lower portion may be made from cloth.

FIG. 15B shows another receptacle embodiment where the sheet 54 is made from a corrugated paper or a corrugated plastic material. In the case of corrugated paper, the receptacle 16 may be attached directly to the sides of the container or secured directly to the leg of the hanger bar profile along the upper portions 52 and 52A, thus eliminating the hanger bar.

In addition to various materials being employed to form the receptacles, the structure of the receptacle itself is an important consideration. According to FIG. 15C, the lower portion 54 of the receptacle 16 is in the form of a compliant scrim or mesh screen. Thus, the receptacle not only assists in maintaining objects disposed therein in a suspended manner, but also can serve other functions such as assisting and allowing a freshly washed part to dry in an expedient manner or allowing for air circulation over an object, if necessary.

FIG. 15D shows a receptacle 16 comprising a reinforced film material 84 forming a sleeve type receptacle, with an interior foam laminate 86 which serves to protect the objects contained therein from scratching or marring.

Figure 25:
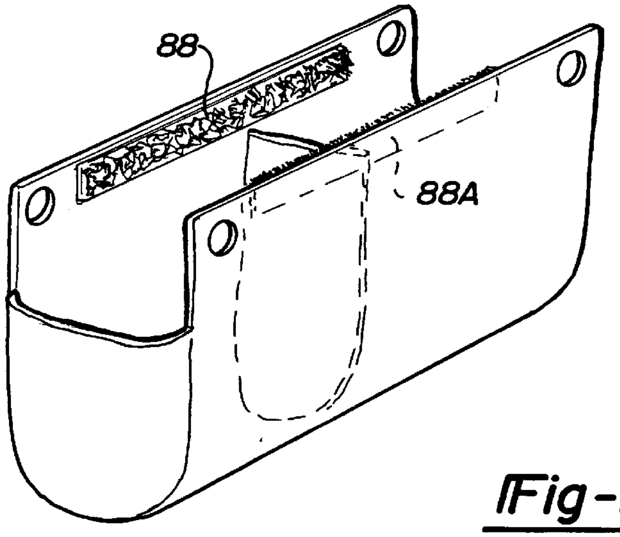
FIG. 25 is a perspective view of another receptacle embodiment having a closure assembly along the top edges thereof.

Referring to the receptacle 16 illustrated with reference to FIG. 16, it may also be desirable to close the receptacle upon receipt one or more objects therein to further protect object from marring or general exposure to the environment. In this regard, mating fasteners 88 and 88A are provided along the top edge 90 or edges of the receptacle which can be selectively joined to close the receptacle. Although, a standard hook and loop fastening structure such as that available from VELCRO U.S.A., is often preferred, other fasteners such as snaps and buttons, to name few, can also be utilized. Instead of multiple mating fasteners, it may be desired to employ a single mating fastener assembly 88 and 88A as shown in FIG. 25. To provide additional protection and keep out contaminates such as dirt, dust and grime which could damage the object contained therein. Other specialized materials such as anti-static films or moisture barrier products may be utilized in the formation of the receptacle to provide additional protection from static electricity or from moisture, or other specialized features as the application dictates.

Still further, receptacle embodiments are illustrated in FIGS. 21 and 22, respectively. As shown in FIG. 21, the receptacle 16 includes elongated pockets 18 provided along one side of the receptacle. FIG. 22 on the other hand illustrates an embodiment wherein multiple pockets 18 are employed along the outer sides and a single central pocket 18A is disposed between the two outer sides.

Referring to FIG. 18, still another receptacle embodiment 16 is illustrated in the form of a continuous convoluted sheet which includes a plurality of open areas or pockets 18 for receiving objects in a suspended manner. Thus, as should be recognized by those skilled in the art, the receptacle embodiments are capable of having a variety of different forms. In all cases the receptacles are specially designed and integrated into the packaging system so that they are orientated in the container so as to allow for loading and unloading of objects through the top opening of the various receptacles.

As will be apparent to those skilled in the art, various changes and modifications may be made to the present invention without departing from the spirit and scope of the invention as determined in the appended claims and their legal equivalent.

What is claimed:

1. A method for converting a support structure into an apparatus for at least temporarily storing one or more objects in a suspended state, said method comprising the steps of:

(a) attaching a pair of opposing elongated hanger bar profiles to opposing sidewalls of said support structure;

(b) suspending a pair of hanger bars from said pair of hanger bar profiles so as to extend between and transverse to said pair of opposing elongated hanger bar profiles; and (c) suspending at least one compliant receptacle from said pair of hanger bars such that said at least one compliant receptacle generally extends in a plane which is transverse to longitudinal axes of said pair of hanger bars, whereby objects can be inserted into said at least one compliant receptacle and maintained in a suspended manner such that said object is substantially protected from damage due to impact.

2. The method according to claim 1, wherein said at least one compliant receptacle includes a plurality of apertures by which said compliant receptacle is suspended.

3. A method of converting a support structure having a pair of free edges into an apparatus for at least temporarily storing one or more objects in a suspended state, said method comprising the steps of:

(a) attaching at least one compliant receptacle to a pair of elongated hanger bars; and (b) attaching said pair of elongated hanger bars having downwardly extending terminal end portions over a pair of opposing free edges of said support structure so as to extend between and transverse to said pair of opposing free edges of said support structure such that the at least one compliant receptacle suspends downwardly from said pair of hanger bars, said at least one compliant receptacle generally extending in a plane which is transverse to longitudinal axes of said pair of hanger bars;

whereby objects can be inserted into said at least one compliant receptacle and maintained in a suspended manner such that said object is substantially protected from damage due to impact.

4. The method according to claim 3, wherein said plurality of compliant receptacles are attached to said pair of hanger bars with a plurality of connectors.

5. The method according to claim 3, wherein said at least one compliant receptacle is slidable longitudinally along said pair of hanger bars.

6. The method according to claim 3, wherein said plurality of compliant receptacles include a plurality of apertures by which said at least one compliant receptacles are suspended.

7. A system for converting a support structure having a pair of opposing free edges into one for retaining objects in a suspended manner, said system comprising:

a pair of substantially elongated profiles which are selectively attachable over said pair of opposing free edges of said support structure;

a pair of hanger bars extending between and engaged with said elongated profiles; and at least one compliant receptacle which extends from said pair of hanger bars, said at least one compliant receptacle having a rectangular configuration including an aperture in each corner thereof for receiving said hanger bars, said at least one compliant receptacle extending generally transversely to said pair of hanger bars and being capable of receiving objects of varying geometries such that said at least one compliant receptacle can conform essentially to the geometry of said objects contained therein.

8. The system of claim 1, wherein said at least one compliant receptacle includes means for selectively closing the receptacle to retain an object deposited therein.

9. The system of claim 1, wherein said at least one compliant receptacle includes an upper portion made from a relatively rigid high strength material and a lower portion made from a compliant material.

10. The system of claim 1, wherein said at least one compliant receptacle includes a mesh screen for supporting objects inserted into said at least one compliant receptacle.

11. The system of claim 1, wherein the said at least one compliant receptacle is formed from corrugated paper or plastic.

12. The system of claim 1, wherein said at least one compliant receptacle includes a plurality of compartments for receiving objects.

13. The system of claim 1, wherein said at least one compliant receptacle includes a top opening for inserting and removing objects from the receptacle.

14. The system of claim 1, wherein said at least one compliant receptacle includes a foam lining.

15. The system of claim 1, wherein said at least one compliant receptacle is slidable longitudinally relative to said pair of hanger bars.

16. A system for converting a support structure having a pair of opposing free edges into one for retaining objects in a suspended manner, said system comprising:

a pair of elongated hanger bars selectively attachable over said pair of opposing free edges of the support structure; and a plurality of compliant receptacles extending from said pair of elongated hanger bars, said compliant receptacles having a generally rectangular configuration including an aperture in each corner thereof for receiving said hanger bars, said compliant receptacles extending generally transversely to said pair of hanger bars and being capable of receiving an object such that said compliant receptacles can conform to the geometry of said object whereby said object is substantially protected from damage due to impact.

17. The system of claim 16, wherein said hanger bars include first and second terminal ends separated by a body, said first and second ends extending downwardly from the body.

18. The system of claim 17, wherein said terminal ends have a substantially inverted U-shape.

19. The system of claim 16, wherein said plurality of compliant receptacles includes means for selectively closing the receptacle to retain an object deposited therein.

20. The system of claim 16, wherein said plurality of compliant receptacles include an upper portion made from a relatively rigid high strength material and a lower portion made from a compliant material.

21. The system of claim 16, wherein said compliant receptacles include a mesh screen which support objects inserted into the receptacle.

22. The system of claim 16, wherein the said compliant receptacles are formed from corrugated paper or plastic.

23. The system of claim 16, wherein the said compliant receptacles include a plurality of compartments for receiving objects.

24. The system of claim 16, wherein said compliant receptacles include a top opening for inserting and removing objects from the receptacle.

25. The system of claim 16, wherein said compliant receptacles include a foam lining.

26. The system of claim 16, wherein said plurality of compliant receptacles are slidable longitudinally relative to said pair of elongated hanger bars.

27. An apparatus for supporting objects in a suspended manner, comprising:

a container having a plurality of sidewalls and a bottom; and a suspension system kit for converting said container into an apparatus for supporting objects in a suspended manner, including:

a pair of substantially elongated profiles which are selectively attachable over a pair of opposing free edges of said plurality of sidewalls;

a pair of hanger bars suspended from said pair of profiles so as to extend between and transverse to said pair of profiles; and at least one compliant receptacle extending from said pair of hanger bars into said container generally in a plane which is transverse to the longitudinal axes of said pair of hanger bars, said at least one compliant receptacle being capable of receiving objects of varying geometries such that said receptacles can conform essentially to the geometry of said object contained therein.

28. A system for converting a support structure having a pair of opposing free edges into one for retaining objects in a suspended manner, said system comprising:

a pair of substantially elongated profiles which are selectively attachable over said pair of opposing free edges of said support structure, each of said profiles including a body and an incurved upwardly extending terminal end to form a channel;

a pair of hanger bars suspended from said channel of respective ones of said pair of profiles; and a plurality of compliant receptacles extending from said pair of hanger bars, said compliant receptacles having a rectangular configuration including an aperture in each corner thereof for receiving said hanger bars.

29. The system of claim 28, wherein said body of said pair of profiles includes a first terminal end defined by first and second legs separated by a web portion to form a second channel, whereby said edge of the support structure is received within the second channel upon attachment of said at least one profile to said support structure.

30. The system of claim 29, wherein said first leg of said profiles are angled inwardly toward the body and are outwardly displaceable away from the body to accommodate free edges of various size.

31. The system of claim 28, wherein said pair of profiles each include a leg extending upwardly from said web which provides a stop to preclude lateral displacement of objects resting upon said web.

32. The system of claim 28, wherein said body of said pair of profiles include a downwardly extending outcurved terminal end for attachment over an edge of a support structure.

33. The system of claim 28, wherein said incurved upwardly extending terminal end includes a tongue which extends sufficiently into said channel to thereby form a stop which assists in precluding the undesired removal of said hanger bars from said profiles.

34. The system of claim 33, wherein said tongue extends at a downward angle in a direction of said body.

35. A system for converting a support structure having a pair of opposing free edges into one for retaining objects in a suspended manner, said system comprising:

a pair of elongated profiles which are selectively attachable over said pair of opposing free edges of said support structure;

a pair of sheets attached to and suspended downwardly from respective ones of said pair of elongated profiles; and at least one pouch portion having a first end attached to one of said pair of sheets and a second end attached to the other of said pair of sheets, said at least one pouch portion extending generally perpendicular to said pair of sheets;

wherein said pair of elongated profiles, said pair of sheets and said at least one pouch portion are attached to one another to form a unitary structure.

* * * * *

UNITED STATES PATENT AND TRADEMARK OFFICE
CERTIFICATE OF CORRECTION

PATENT NO. : 5,815,903

DATED : October 6, 1998

INVENTOR(S) : James Foster et al

It is certified that error appears in the above-identified patent and that said Letters Patent is hereby corrected as shown below:

Title Page, [75] Inventors, "Lakewood" should be --Bloomfield Hills-- and "Purdue" should be --Farmington Hills--

Col. 3, line 38, delete "hangar" and substitute --hanger-- therefor

Col. 4, line 23, delete "and" and substitute --or-- therefor

Col. 5, line 4, delete "a" and substitute --an-- therefor

Col. 5, line 6, delete "connectors." and substitute --connectors;-- therefor

Col. 6, line 60, delete "seat" and substitute --is seated-- therefor

Col. 7, line 4, delete "sold" and substitute --solid-- therefor

Col. 8, line 14, delete "an"

Col. 8, line 45, delete "of the"

Col. 11, line 33, delete "while"

Col. 12, line 23, delete "form" and substitute --from-- therefor

Col. 14, line 1, delete "FIGS." and substitute --FIG.-- therefor

UNITED STATES PATENT AND TRADEMARK OFFICE

CERTIFICATE OF CORRECTION

PATENT NO. : 5,815,903

DATED : October 6, 1998

INVENTOR(S) : James Foster et al

It is certified that error appears in the above-identified patent and that said Letters Patent is hereby corrected as shown below:

Col. 14, line 33, after "receipt" insert --of--

Col. 14, line 43, delete "FIG. 25. To" and substitute --FIG. 25 to-- therefor

Col. 16, line 9, claim 8, "claim 1" should be --claim 7--

Col. 16, line 12, claim 9, "claim 1" should be --claim 7--

Col. 16, line 16, claim 10, "claim 1" should be --claim 7--

Col. 16, line 19, claim 11, "claim 1" should be --claim 7--

Col. 16, line 22, claim 12, "claim 1" should be --claim 7--

Col. 16, line 25, claim 13, "claim 1" should be --claim 7--

Col. 16, line 28, claim 14, "claim 1" should be --claim 7--

Col. 16, line 30, claim 15, "claim 1" should be --claim 7--

Signed and Sealed this

Twenty-first Day of March, 2000

Attest:

Q. TODD DICKINSON

*Attesting Officer*

*Commissioner of Patents and Trademarks*